(12) United States Patent
Chen et al.

(10) Patent No.: US 12,701,080 B2
(45) Date of Patent: Aug. 4, 2026

(54) METHODS FOR SENDING DATA PACKET, RELATED DEVICES AND STORAGE MEDIUM

(71) Applicant: BEIJING XIAOMI MOBILE SOFTWARE CO., LTD., Beijing (CN)

(72) Inventors: Dong Chen, Beijing (CN); Xiaopeng Fan, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 342 days.

(21) Appl. No.: 18/289,978

(22) PCT Filed: May 10, 2021

(86) PCT No.: PCT/CN2021/092872
§ 371 (c)(1),
(2) Date: Nov. 8, 2023

(87) PCT Pub. No.: WO2022/236621
PCT Pub. Date: Nov. 17, 2022

(65) Prior Publication Data
US 2024/0250908 A1 Jul. 25, 2024

(51) Int. Cl.
*H04L 45/00* (2022.01)
*H04L 45/121* (2022.01)
*H04L 45/745* (2022.01)
(52) U.S. Cl.
CPC .......... *H04L 45/745* (2013.01); *H04L 45/121* (2013.01)

(58) Field of Classification Search
CPC ....... H04L 12/66; H04L 45/10; H04L 45/121; H04L 45/17; H04L 45/22; H04L 45/243; H04L 45/247; H04L 45/54; H04L 45/645; H04L 45/655; H04L 45/70; H04L 45/74; H04L 45/745; H04L 45/7452;
(Continued)

(56) References Cited

U.S. PATENT DOCUMENTS 11,706,149 B2 * 7/2023 Geng ..................... H04L 47/28
370/235
2008/0123682 A1 5/2008 Yackoski et al.
(Continued)

FOREIGN PATENT DOCUMENTS

CN 109905897 A 6/2019
CN 110324242 A 10/2019

OTHER PUBLICATIONS

Marchese et al., A Source Routing Algorithm Based on CGR for DTN-Nanosatellite Networks, IEEE, 6 pages, Dec. 4-8, 2017.*
(Continued)

*Primary Examiner* — Frank Duong
(74) *Attorney, Agent, or Firm* — Cozen O'Connor

(57) ABSTRACT
A method for sending a data packet is performed by a first device. The method includes: sending a first data packet based on a format of the first data packet; in which the first data packet includes a router identifier field and a time field; the router identifier field includes a router identifier and the router identifier is used for indicating a router for sending the first data packet; the time field includes a first time and a second time corresponding to the router identifier, and the first time and the second time are used for indicating a time range within which the router completes sending the first data packet.

20 Claims, 4 Drawing Sheets

(58) Field of Classification Search
      CPC . H04L 45/7453; H04L 45/7459; H04L 45/76;
              H04L 45/80; H04L 45/85; H04L 45/851;
              H04L 47/22; H04L 47/28; H04L 49/25;
                H04L 49/256; H04L 49/3009; H04L
              49/309; H04L 65/1069; H04L 65/1101;
              H04L 69/16; H04L 69/22; H04L 69/28
      See application file for complete search history.

(56)                     References Cited

U.S. PATENT DOCUMENTS

| | | |
|---|---|---|
| 2008/0137691 A1 | 6/2008 | Barry et al. |
| 2010/0177753 A1* | 7/2010 | Bahr ........................ H04L 45/26 |
| | | 370/408 |
| 2018/0069786 A1* | 3/2018 | Lokman .............. H04L 63/1475 |
| 2021/0297362 A1* | 9/2021 | Eckert ..................... H04L 47/32 |
| 2024/0098012 A1* | 3/2024 | Chen .................... H04L 45/566 |

OTHER PUBLICATIONS

European Patent Application No. 21941197.2, Search and Opinion
dated May 10, 2024, 12 pages.
Chinese Patent Application No. 2021800015289 Office Action
dated Nov. 8, 2024, with English translation, 13 pages.

* cited by examiner

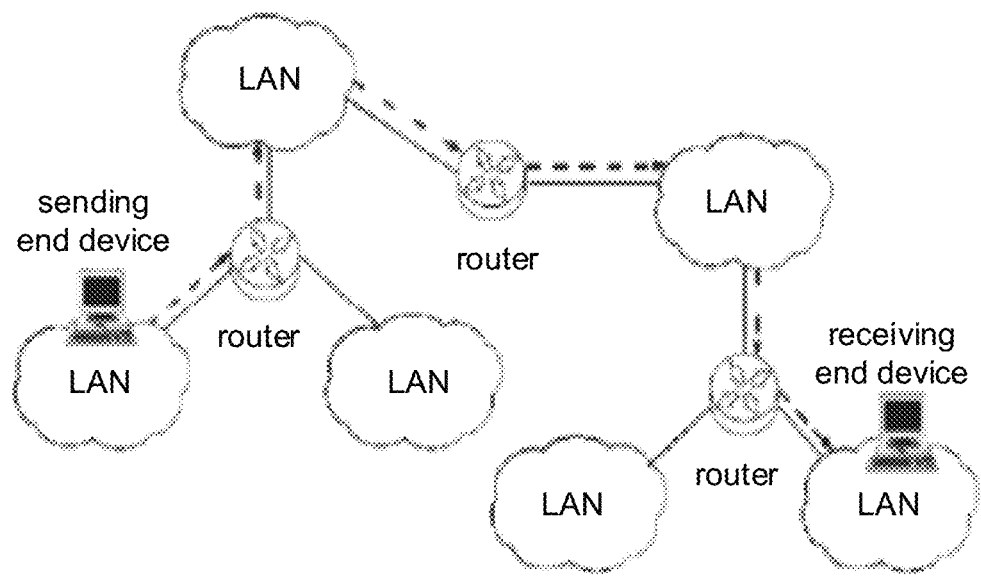

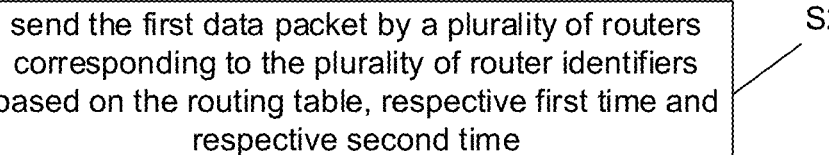

send the first data packet by a plurality of routers corresponding to the plurality of router identifiers based on the routing table, respective first time and respective second time          S21

FIG. 4 receive a first data packet based on a format of the first data packet          S31

FIG. 5 send the first data packet by a plurality of routers corresponding to the plurality of router identifiers based on the routing table, respective first time and respective second time          S41

FIG. 6

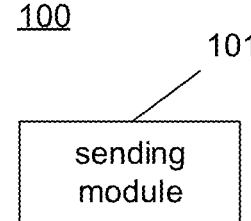

100

101 sending module

FIG. 7

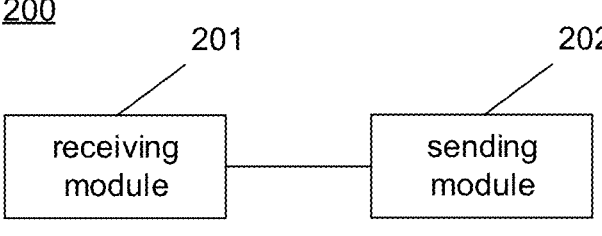

200

201                          202 receiving module          sending module

FIG. 8

METHODS FOR SENDING DATA PACKET, RELATED DEVICES AND STORAGE MEDIUM

CROSS-REFERENCE TO RELATED APPLICATION

This application is a U.S. national phase application of International Application No. PCT/CN2021/092872, filed on May 10, 2021, the content of which is hereby incorporated by reference in its entirety for all purposes.

TECHNICAL FIELD

The disclosure relates to the field of wireless communication technology, and in particular to methods and apparatuses for sending a data packet, and a storage medium.

BACKGROUND

The Internet Protocol (IP) is a protocol for information transmission between networks, which can transfer IP data packets (also called IP packets) from a source device (also called a sending end device) to a destination device (also called a receiving end device). In the process of transmitting an IP data packet from the source device to the destination device, the IP data packet is usually transmitted based on an IP address of the destination device and a router-based network transmission mechanism.

SUMMARY

According to the first aspect of embodiments of the disclosure, there is provided a method for sending a data packet, which is performed by a first device. The method includes:

sending a first data packet based on a format of the first data packet. The first data packet includes a router identifier field and a time field. The router identifier field includes a router identifier, which is used for indicating a router for sending the first data packet, The time field includes a first time and a second time corresponding to the router identifier. The first time and the second time are used for indicating a time range within which the router completes sending the first data packet.

According to a second aspect according to embodiments of the disclosure, there is provided a method for sending a data packet, which is performed by a second device. The method includes:

receiving a first data packet based on a format of the first data packet. The first data packet includes a router identifier field and a time field. The router identifier field includes a router identifier, which is used for indicating a router for sending the first data packet. The time field includes a first time and a second time corresponding to the router identifier. The first time and the second time are used for indicating a time range within which the router completes sending the first data packet.

According to a third aspect according to embodiments of the disclosure, there is provided a device for sending a data packet. The device includes:

a processor; and a memory storing machine-readable instructions that, when executed by the processor, cause the processor to send a first data packet based on a format of the first data packet; in which the first data packet includes a router identifier field and a time field; the router identifier field includes a router identifier and the router identifier is used for indicating a router for sending the first data packet; the time field includes a first time and a second time corresponding to the router identifier, and the first time and the second time are used for indicating a time range within which the router completes sending the first data packet.

BRIEF DESCRIPTION OF THE DRAWINGS

The accompanying drawings, which are incorporated in and constitute a part of this specification, illustrate embodiments consistent with the disclosure and together with the description serve to explain the principles of the disclosure.

FIG. 1 is an architecture diagram illustrating a system for transmitting an IP data packet according to an example embodiment.

FIG. 2 is a schematic diagram illustrating a format of an IP data packet according to an example embodiment.

FIG. 3 is a flowchart illustrating a method for sending a data packet according to an example embodiment.

FIG. 4 is a flowchart illustrating another method for sending a data packet according to an example embodiment.

FIG. 5 is a flowchart illustrating yet another method for sending a data packet according to an example embodiment.

FIG. 6 is a flowchart illustrating yet another method for sending a data packet according to an example embodiment.

FIG. 7 is a block diagram illustrating an apparatus for sending a data packet according to an example embodiment.

FIG. 8 is a block diagram illustrating another device for sending a data packet according to an example embodiment.

DETAILED DESCRIPTION

Figure 9:
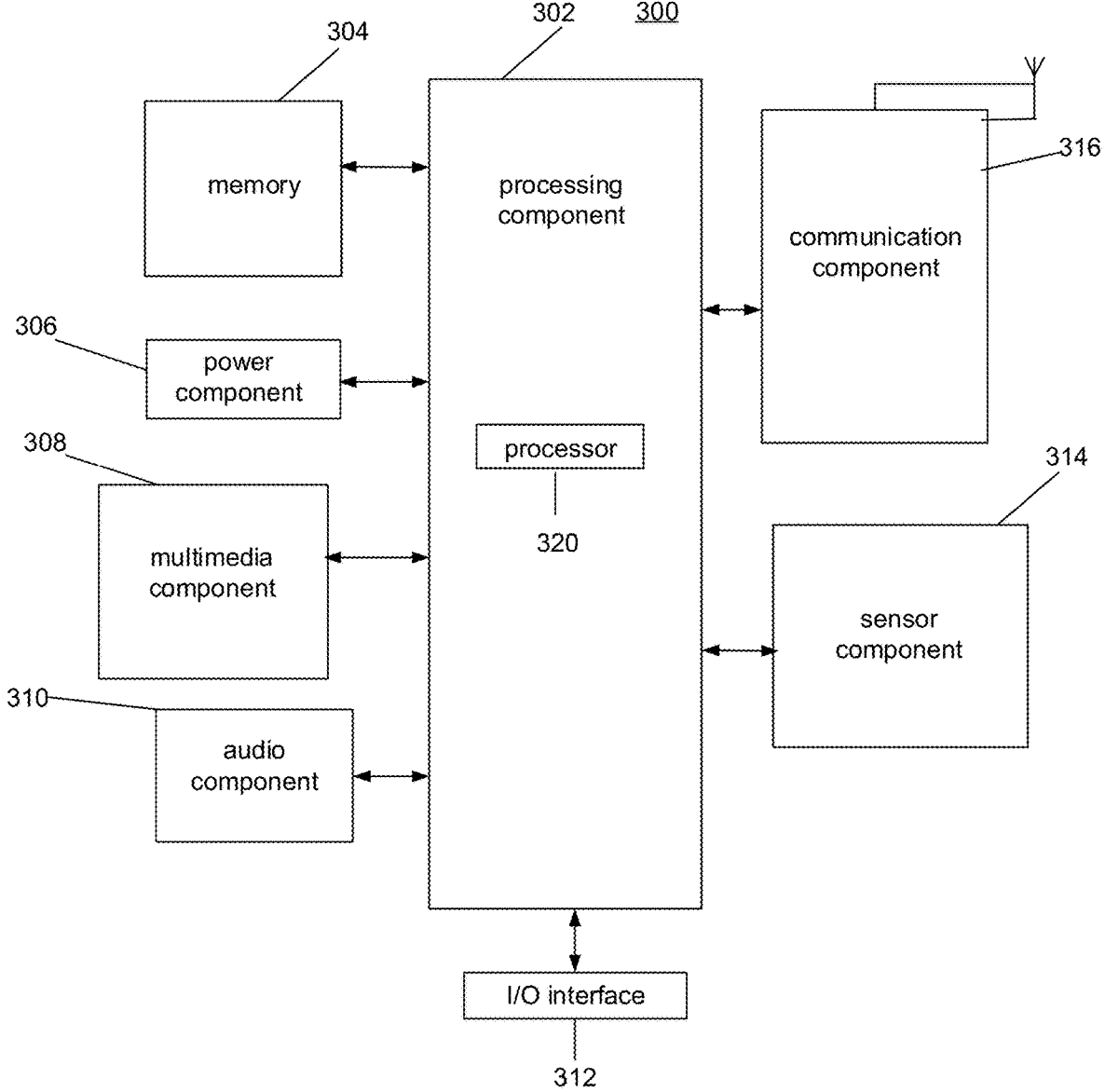
FIG. 9 is a block diagram illustrating an apparatus for sending a data packet according to an example embodiment.

Reference will now be made in detail to embodiments, examples of which are illustrated in the accompanying drawings. When the following description refers to the accompanying drawings, the same numerals in different drawings refer to the same or similar elements unless otherwise indicated. The implementations described in the following examples do not represent all implementations consistent with the disclosure. Rather, they are merely examples of apparatuses and methods consistent with aspects of the disclosure as recited in the appended claims.

In the communication technology, Internet Protocol (IP) is a protocol for information transmission between networks, which can transmit IP data packets from a source device to a destination device. In the process of transmitting an IP data packet from the source device to the destination device, the IP data packet is usually transmitted based on an IP address of the destination device and a router-based network transmission mechanism.

In one aspect, the IP stipulates that all devices on the Internet network (e.g., the aforementioned source and destination devices) must have a unique IP address. In other words, there is a one-to-one correspondence between the IP addresses and the devices. The IP data packet must contain the IP address of the destination device, and the data packet is transmitted to the destination device based on the IP address contained in the data packet. Each device on the Internet network can have multiple IP addresses, but each device has at least one unique IP address.

On the other hand, the Internet is a large network formed by many network connections. When transmitting an IP data packet between the Internets, in addition to the above-mentioned IP address of the destination device, there must have a router-based network transmission mechanism. The router-based network transmission mechanism can transmit the IP data packet to the destination device through multiple routers. The router-based network transmission mechanism may also be referred to as IP routing transmission mechanism.

In the related art, various networks are connected to each other through routers. The function of the router is to choose a transmission path for the IP data packet. The source device sends the IP data packet and determines the routers through which the IP data packet is transmitted. That is, the source device is fully aware of each router that the IP data packet passes through and stipulates the specific time when each router sends the IP data packet. In this way, the precise time when the IP data packet arrives at the destination device is guaranteed. However, there is a situation where a single router needs to send multiple IP data packets at the same time. In this case, the requirement on the processing capability of the router is very high. When the ability of the router of processing the IP data packet cannot support sending multiple IP data packets at the same time, it cannot guarantee that the IP data packets reach respective destination devices on time.

FIG. 1 is an architecture diagram illustrating a system for transmitting an IP data packet according to an example embodiment. The communication method according to disclosure may be applied to the architecture diagram of the communication system illustrated in FIG. 1. As illustrated in FIG. 1, the source device (i.e., the source computer in FIG. 1) can send the IP data packet based on the architecture illustrated in FIG. 1 and the IP data packet is transmitted to the destination device (e.g., the destination computer in FIG. 1) through multiple routers.

FIG. 2 is a schematic diagram illustrating a format of an IP data packet according to an example embodiment. In the related art, an IP data packet includes a source address and a destination address, and the format of the IP data packet is illustrated in FIG. 2. The IP data packet includes a fixed part. For example, the fixed part includes "version," "header length," "differentiated services," "total length," "identification," "flag," "fragment offset," "time to live," "protocol," "header checksum," "source address," and "destination address". The IP data packet also includes an optional field of a variable length.

It may be seen that after the IP data packet is sent by the source device, the routers forward the IP data packet during the process of transmitting the IP data packet. The transmission path of the IP data packet is unknown for the source device, and the source device cannot determine the respective processing time of the IP data packet on each router. Therefore, after the source device sends the IP data packet, the source device cannot determine the time when the IP data packet arrives at a destination device.

Based on this, it is proposed in the related art that the source device determines the routers through which the IP data packet is transmitted, determines a relative time (i.e., the specific time) for each router to process the IP data packet, and determines a time when each router sends the IP data packet.

For example, the IP data packet includes a source device IP address, a destination device IP address, router identifiers for transmitting the IP data packet, and a processing time corresponding to the router identifier. The router identifiers for transmitting the IP data packet may be contained in the IP data packet in a form of a routing table. The routing table includes a plurality of router addresses for transmitting an IP data packet. As mentioned above, each router address corresponds to a respective processing time. For example, the routing table includes N router addresses for transmitting the IP data packet, in which the N router addresses respectively correspond to the processing time. The router address A corresponds to the first time A, the router address B corresponds to the first time B . . . and the router address N corresponds to the processing time N.

In embodiments of the disclosure, the IP data packet is sent from the source device and transmitted in an order of the router addresses contained in the routing table. In an implementation by taking the router address B as an example, in response to receiving the IP data packet by the router address B, the processing time B corresponding to the router address B in the IP data packet and a next router address C are determined. After the router address B processes the IP data packet, the IP data packet is sent to the next hop in the routing table (i.e., the next router address C) at the processing time B, until the IP data packet is transmitted to the destination address.

However, in the related art, it is necessary to strictly follow the time requirement and send the IP data packet at a specific time defined in the data packet. For the router, the requirement on the capability of the router is high. Generally, the router can process many data packets from different devices and different source addresses in parallel and send these data packets to different devices and different destination addresses. When a router needs to send a lot of data packets at the same time, this will challenge the parallel processing capability of the router.

Based on this, the disclosure provides a method for transmitting a data packet. By increasing the time offset of sending the IP data packet for a router that forwards the IP data packet, the router can send the IP data packet within a time range of the time offset based on the sending time, thereby guaranteeing the precise time when the IP data packet arrives at the destination device while reducing the pressure on the router to process the data packet.

It is understandable that the architecture diagram of a system for transmitting an IP data packet illustrated in FIG. 1 is only for schematic illustration, and the wireless communication system may also include, not illustrated in FIG. 1, other network devices, such as a core network device, a wireless relay device and a wireless backhaul device. Embodiments of the disclosure does not limit the number of network devices and the number of terminals included in the wireless communication system.

It is further understandable that the wireless communication system according to embodiments of the disclosure is a network that provides a wireless communication function. The wireless communication system can use different communication technologies, such as code division multiple access (CDMA), wideband code division multiple access (WCDMA), time division multiple access (TDMA), frequency division multiple access (FDMA), orthogonal frequency-division multiple access (OFDMA), single carrier FDMA (SC-FDMA), or carrier sense Multiple Access with Conflict Avoidance. Based on the capacity, speed, delay and other factors of different networks, the network may be classified as a second Generation (2G) network, a 3G network, a 4G network or a future evolution network, such as a 5G network. The 5G network can also be called New Radio (NR). For convenience of description, the disclosure sometimes simply refers to a wireless communication network as a network.

Further, the network device involved in the disclosure may also be referred to as a wireless access network device. The wireless access network device may be a base station, an evolved node B (base station), a home base station, an access point (AP) in a wireless fidelity (WIFI) system, a wireless relay node, a wireless backhaul node, a transmission point (TP) or a transmission and reception point (TRP), etc. The wireless access network device may be a gNB in an NR system, or the wireless access network device may be a component or a part of device that constitutes a base station. When it is a vehicle-to-everything (V2X) communication system, the network device may be a vehicle-mounted device. It is understandable that in embodiments of the disclosure, the specific technology and specific device form adopted by the network device are not limited.

Further, the device involved in the disclosure may also be referred to as terminal, User Equipment (UE), Mobile Station (MS), Mobile Terminal (MT), etc. The device can provide voice and/or data connectivity for the user. For example, the terminal may be a handheld device or a vehicle-mounted device with a wireless connection function. At present, examples of the terminal include: smart phone (or mobile phone), pocket personal computer (PPC), palm-top computer, personal digital assistant (PDA), notebook computer, tablet computer, wearable device, or vehicle-mounted device. In addition, when it is a vehicle-to-everything (V2X) communication system, the terminal may be a vehicle-mounted device. It is understandable that in embodiments of the disclosure, the specific technology and specific device form adopted by the terminal are not limited.

FIG. 3 is a flowchart illustrating a method for sending a data packet according to an example embodiment. As illustrated in FIG. 3, the method for sending a data packet is performed by a first device. The method includes the following.

In step S11, a first data packet is sent based on a format of the first data packet.

In embodiments of the disclosure, the first data packet includes: a router identifier field and a time field.

The router identifier field includes a router identifier, and the router identifier is used for indicating a router for sending the first data packet.

The time field includes a first time and a second time corresponding to the router identifier; and the first time and the second time are used for indicating a time range within which the router completes sending the first data packet.

In an implementation, a field corresponding to the first time and a field corresponding to the second time are added to the "optional field" or the "padding field" included in the format of the IP data packet illustrated in FIG. 2. In another implementation, the field corresponding to the first time and the field corresponding to the second time may be added as new fields to the format illustrated in FIG. 2.

In an implementation, the first time is a time when the router sends the first data packet, and the second time is a time offset, relative to the first time, allowed by the router for sending the first data packet. In some embodiments of the disclosure, the first time is an absolute time. That is, the first time is a moment when the router sends the first data packet.

For example, after the first data packet is sent from the source device (i.e., the sending end), the routers through which the transmission of the first data packet passes are determined by the sending end, and thus the sending end knows each router passed by transmission of the first data packet. In addition, it is stipulated that each router sends the first data packet at a specific time point (that is, the absolute time). The clock time may be obtained through a global positioning system (GPS) clock. Certainly, the clock time may be obtained through other methods, which is not limited in embodiments of the disclosure. The time at which the first data packet is sent is T, so as to ensure the precise time when the first data packet arrives at the destination address. Moreover, the first data packet also includes an offset t that is allowed by each router passed through, such that the time at which the first data packet is sent by the router is within a range from (T−t) to (T+t). In other words, the router only needs to send the data packet at a time within the range from (T−t) to (T+t). In this way, the effect of reducing the requirement on the ability of the router of processing the data packet is achieved.

In an implementation, the first time is an earliest time for the router to send the first data packet, and the second time is a latest time for the router to send the first data packet. In some embodiments of the disclosure, each of the first time and the second time is the absolute time. That is, the first time and the second time each is a moment when the router sends the first data packet.

For example, after the first data packet is sent from the source device (i.e., the sending end), the routers through which the transmission of the first data packet passes are determined by the sending end, such that the sending end can know each router through which the first data packet passes. In addition, it is stipulated that each router sends the first data packet at a specific time point (that is, the absolute time). The clock time may be obtained based on the GPS clock. Certainly, the clock time may be obtained through other methods, which is not limited in the disclosure. The earliest time for sending the first data packet may be T1, and the latest time for sending the first data packet may be T2, so as to ensure the precise time when the first data packet arrives at the destination address. The time at which the first data packet is sent by the router is within a range from T1 to T2. In other words, the router only needs to send the data packet at a time within the range from T1 to T2. In this way, the effect of reducing the requirement on the ability of the router of processing the data packet is achieved.

The first data packet may be an IP data packet, and the disclosure refers to the IP data packet as the first data packet for convenience of description.

In some embodiments of the disclosure, the above mentioned "router identifier included in the router identifier field" means a plurality of router identifiers contained in a routing table, and the plurality of router identifiers respectively have corresponding time ranges for sending the first data packet.

FIG. 4 is a flowchart illustrating a method for sending a data packet according to an example embodiment. As illustrated in FIG. 4, the method for sending a data packet is performed by the first device. The method includes the following.

In step S21, a plurality of routers corresponding to the plurality of router identifiers send the first data packet based on the routing table, respective first time and respective second time.

In embodiments of the disclosure, in addition to the source address and the destination address, the first data packet also includes a routing list (also called the routing table) and the specific time (absolute time) when a current router sends the first data packet to a next router (or the destination address). The "router identifier" mentioned in the disclosure is a router address included in the routing list.

For example, when the first time is the time when the router sends the first data packet and the second time is a time offset, relative to the first time, allowed by the router for sending the first data packet, then the first data packet includes a source address, a destination address, a router address 1, a time when a router 1 sends the data packet (i.e., the first time of the router 1), a time offset of the time when the router 1 sends the data packet (i.e., the second time of the router 1), a router address 2, a time when a router 2 sends the data packet (i.e., the first time of the router 2), a time offset of the time when the router 2 sends the data packet (i.e., the second time of the router 2), . . . , a router address N, a time when a router N sends the data packet (i.e., the first time of the router N), and a time offset of the time when the router N sends the data packet (i.e., the second time of the router N). The time when sending the data packet is an absolute time.

For example, if the first time is the earliest time for the router to send the first data packet and the second time is the latest time for the router to send the first data packet, then the first data packet includes a source address, a destination address, a router address 1, an earliest time for the router 1 to send the data packet (i.e. the first time of the router 1), a latest time for the router 1 to send the data packet (i.e. the second time of the router 1), a router address 2, an earliest time for the router 2 to send the data packet (i.e., the first time of the router 2), a latest time for the router 2 to send the data packet (i.e., the second time of the router 2), . . . , a router address N, an earliest time for the router N to send the data packet (i.e., the first time of the router N), and a latest time for the router N to send the data packet (i.e., the second time of the router N). The time when sending the data packet is an absolute time.

After the first data packet is sent from the sender, the first data packet is transmitted to a next hop based on the routing list in turn. In other words, the current router sends the first data packet to the next router contained in the routing list until the first data packet reaches the destination address. That is, the first data packet is sent from the source address, passes through the router address 1, the router address 2, . . . , the router address N in sequence, and finally arrives at the destination address. Therefore, the time when the first data packet arrives at the destination address from the source address may be accurately and controllable, and the time offset of the time when the first data packet arrives at the destination address may be determined.

In some embodiments of the disclosure, the first data packet further includes a hop count field.

The hop count field includes a number of hops. The number of hops includes a total number of hops for the transmission of the first data packet by the router indicated by the router identifier and a number of hops from the router to the destination device. In other words, in embodiments of the disclosure, the hop count field added in the first data packet indicates the number of router addresses through which the transmission of the first data packet from the source address to the destination address needs to pass.

Based on the same/similar idea, embodiments of the disclosure also provide a method for sending a data packet.

FIG. 5 is a flowchart illustrating a method for sending a data packet according to an example embodiment. As illustrated in FIG. 5, the method for sending a data packet is performed by a second device. The method includes the following.

In step S31, a first data packet is received based on a format of the first data packet.

In embodiments of the disclosure, the first data packet includes: a router identifier field and a time field.

The router identifier field includes a router identifier, and the router identifier is used for indicating a router for sending the first data packet.

The time field includes a first time and a second time corresponding to the router identifier; and the first time and the second time are used for indicating a time range within which the router completes sending the first data packet.

In an implementation, the second device may determine, based on the optional field or the padding field included in format of the IP data packet illustrated in FIG. 2, a field corresponding to the first time and a field corresponding to the second time. In another implementation, the field corresponding to the first time and the field corresponding to the second time may be determined based on a newly added field based on FIG. 2.

In some embodiments of the disclosure, the second device may be a router. The source device determines the first data packet, and determines a router identifier for transmitting the first data packet, as well as the first time and the second time corresponding to the router identifier. The router receives the first data packet sent by the source device.

In an implementation, the first time is a time when the router sends the first data packet, and the second time is a timer offset, relative to the first time, allowed by the router for sending the first data packet. In some embodiments of the disclosure, the first time is an absolute time. That is, the first time is a moment when the router sends the first data packet.

For example, after the first data packet is sent from the source device (i.e., the sending end), the routers through which the transmission of the first data packet passes are determined by the sending end, such that the sending end knows each router that the first data packet passes through. In addition, it is stipulated that each router sends the first data packet at a specific time point (that is, the absolute time). The clock time may be determined based on the GPS clock. Certainly, the clock time may be determined through other methods, which is not limited in the disclosure. The time at which the first data packet is sent may be T, so as to ensure the precise time when the first data packet arrives at the destination address. Moreover, the first data packet also includes an offset t that may be tolerated by each router through which the first data packet passes, such that the time at which the first data packet is sent by the router is within a range from (T−t) to (T+t). In other words, the router only needs to send the data packet at the time within the range from (T−t) to (T+t). In this way, the effect of reducing requirement on the ability of the router of processing the data packet is achieved.

In an implementation, the first time is the earliest time for the router to send the first data packet, and the second time is the latest time for the router to send the first data packet. In some embodiments of the disclosure, the first time and the second time each is an absolute time.

For example, after the first data packet is sent from the source device (i.e., the sending end), the routers through which the transmission of the first data packet passes are determined by the sending end, such that the sending end knows each router that the first data packet passes through. In addition, it is stipulated that each router sends the first data packet at a specific time point (i.e., the absolute time). The clock time may be obtained based on the GPS clock. Certainly, the clock time may be obtained through other methods, which is not limited in the disclosure. The earliest time for sending the first data packet may be T1, and the latest time for sending the first data packet may be T2, so as to ensure the precise time when the first data packet arrives at the destination address. The time at which the first data packet is sent by the router is within the range from T1 to T2. In other words, the router only needs to send the data packet at a time within the range from T1 to T2. In this way, the effect of reducing the requirement on the ability of the router of processing the data packet is achieved.

The first data packet may be an IP data packet, and the disclosure refers to the IP data packet as the first data packet for convenience of description.

In some embodiments of the disclosure, the above-mentioned "router identifier included in the router identifier field" means a plurality of router identifiers contained in a routing table, and each of the plurality of router identifiers has a corresponding time range for sending the first data packet.

FIG. 6 is a flowchart illustrating a method for sending a data packet according to an example embodiment. As illustrated in FIG. 6, the method for sending a data packet is performed by the second device. The method includes the following.

In step S41, a plurality of routers corresponding to a plurality of router identifiers send the first data packet based on the routing table, respective first time and respective second time.

In embodiments of the disclosure, in addition to the source address and the destination address, the first data packet also includes a routing list (also called routing table) and the specific time (i.e., absolute time) when the current router sends the first data packet to the next router (or the destination address). The above-mentioned "router identifier" in the disclosure is the router address included in the routing list.

For example, when the first time is the time when the router sends the first data packet and the second time is the time offset, relative to the first time, allowed by the router for sending the first data packet, then the first data packet includes a source address, a destination address, a router address 1, a time when a router 1 sends a data packet (i.e., the first time of the router 1), a time offset tolerated by the router 1 for sending the data packet (i.e., the second time of the router 1), a router address 2, a time when the router 2 sends the data packet (i.e., the first time of the router 2), a time offset tolerated by the router 2 for sending the data packet (i.e., the second time of the router 2), . . . , a router address N, a time when the router N sends the data packet (i.e., the first time of the router N), and a time offset tolerated by the router N for sending the data packet (i.e., the second time of the router N). The time when sending the data packet is an absolute time.

For example, if the first time is the earliest time for the router to send the first data packet and the second time is the latest time for the router to send the first data packet, then the first data packet includes a source address, a destination address, a router address 1, an earliest time for the router 1 to send the data packet (i.e., the first time of the router 1), a latest time for the router 1 to send the data packet (i.e., the second time of the router 1), a router address 2, an earliest time for the router 2 to send the data packet (i.e., the first time of the router 2), a latest time for the router 2 to send the data packet (i.e. the second time of the router 2), . . . , a router address N, an earliest time for the router N to send the data packet (i.e., the first time of the router N), and a latest time for the router N to send the data packet (i.e., the second time of the router N). The time when sending the data packet is an absolute time.

After the first data packet is sent from the sender, the first data packet is transmitted to a next hop according to the routing list in turn. In other words, a current router sends the first data packet to the next router in the routing list until the first data packet reaches the destination address. That is, the first data packet is sent from the source address, passes through the router address 1, the router address 2, . . . , the router address N in sequence, and finally arrives at the destination address. Therefore, the time when the first data packet arrives at the destination address from the source address may be accurately and controllable, and the time offset of the time when the first data packet arrives at the destination address may be determined.

In some embodiments of the disclosure, the first data packet further includes a hop count field.

The hop count field includes a number of hops. The number of hops includes a total number of hops for the transmission of the first data packet by the router indicated by the router identifier and a number of hops from the router to the destination device. In other words, in embodiments of the disclosure, the hop count field added in the first data packet indicates the number of router addresses through which the transmission of the first data packet from the source address to the destination address needs to pass.

Based on the same idea, embodiments of the disclosure further provides apparatuses for sending a data packet.

It is understandable that, in order to realize the above functions, the apparatuses for sending a data packet according to embodiments of the disclosure include corresponding hardware structures and/or software modules for performing various functions. In combination with the units and algorithm steps of each example disclosed in embodiments of the disclosure, embodiments of the disclosure may be implemented in the form of hardware or a combination of hardware and computer software. It is determine whether to use the hardware or a manner of driving the hardware via the computer software to realize a certain function depending on the specific application and design constraints of the technical solution. Those skilled in the art may use different methods to implement the described functions for each specific application, but such implementation should not be regarded as exceeding the scope of the technical solutions according to embodiments of the disclosure.

FIG. 7 is a block diagram illustrating an apparatus for sending a data packet according to an example embodiment. As illustrated in FIG. 7, the apparatus 100 for sending a data packet includes a sending module 101.

The sending module 101 is configured to send a first data packet based on a format of the first data packet. The first data packet includes a router identifier field and a time field. The router identifier field includes a router identifier, and the router identifier is used for indicating a router for sending the first data packet. The time field includes a first time and a second time corresponding to the router identifier, and the first time and the second time are used for indicating a time within which the router completes sending the first data packet.

In embodiments of the disclosure, the first time is a time when the router sends the first data packet, and the second time is a time offset, relative to the first time, allowed by the router for sending the first data packet. Or, the first time is an earliest time for the router to send the first data packet, and the second time is a latest time for the router to send the first data packet.

In embodiments of the disclosure, the first time is an absolute time.

In embodiments of the disclosure, the first data packet is an Internet Protocol (IP) data packet.

In embodiments of the disclosure, the router identifier field includes router identifiers contained in the routing table. The sending module is configured to send the first data packet to a router corresponding to a next router identifier based on the plurality of router identifiers contained in the routing table.

In embodiments of the disclosure, the first data packet further includes a hop count field. The hop count field includes a number of counts. The number of hops includes a total number of hops for the transmission of the first data packet by the router indicated by the router identifier and a number of hops from the router to the destination device.

FIG. 8 is a block diagram illustrating an apparatus for sending a data packet according to an example embodiment. As illustrated in FIG. 8, the apparatus 200 for sending a data packet includes a receiving module 201.

The receiving module 201 is configured to receive a first data packet based on a format of the first data packet. The first data packet includes: a router identifier field and a time field. The router identifier field includes a router identifier, and the router identifier is used for indicating a router for sending the first data packet. The time field includes a first time and a second time corresponding to the router identifier, and the first time and the second time are used for indicating a time within which the router completes sending the first data packet.

In embodiments of the disclosure, the first time is a time when the router sends the first data packet, and the second time is a time offset, relative to the first time, allowed by the router for sending the first data packet. Or, the first time is an earliest time for the router to send the first data packet, and the second time is a latest time for the router to send the first data packet.

In embodiments of the disclosure, the first time is an absolute time.

In embodiments of the disclosure, the first data packet is an Internet Protocol (IP) data packet.

In embodiments of the disclosure, the router identifier field includes a plurality of router identifiers contained in the routing table, and each of the plurality of router identifiers has a corresponding time range for sending the first data packet.

The apparatus for sending a data packet also includes a sending module 202.

The sending module 202 is configured to send the first data packet by the plurality of routers corresponding to the plurality of router identifiers based on the routing table and respective time ranges.

In embodiments of the disclosure, the first data packet further includes a hop count field. The hop count field includes a number of hops. The number of hops includes a total number of hops for the transmission of the first data packet by the router indicated by the router identifier and a number of hops from the router to the destination device.

Regarding the apparatuses in foregoing embodiments, the specific manner in which each module executes operations has been described in detail in embodiments related to the methods, and will not be described in detail here.

FIG. 9 is a block diagram illustrating a device 300 for sending a data packet according to an example embodiment. For example, the device 300 may be a mobile phone, a computer, a digital broadcast terminal, a messaging device, a game console, a tablet device, a medical device, a fitness device, a personal digital assistant, or the like.

As illustrated in FIG. 9, the device 300 may include one or more of: a processing component 302, a memory 304, a power component 306, a multimedia component 308, an audio component 310, an input/output (I/O) interface 312, a sensor component 314, or a communication component 316.

The processing component 302 generally controls the overall operations of the device 300, such as those associated with display, telephone calls, data communications, camera operations, and recording operations. The processing component 302 may include one or more processors 320 to execute instructions to complete all or part of the steps of the above methods. Or, the processing component 302 may include one or more modules that facilitate interaction between the processing component 302 and other components. For example, the processing component 302 may include a multimedia module to facilitate the interaction between the multimedia component 308 and the processing component 302.

The memory 304 is configured to store various types of data to support operations at the device 300. Examples of such data include instructions for any application or method operating on device 300, contact data, phonebook data, messages, pictures, videos, and the like. The memory 304 may be implemented by any type of volatile or non-volatile storage device or their combination, such as static random access memory (SRAM), electrically erasable programmable read-only memory (EEPROM), erasable Programmable Read Only Memory (EPROM), Programmable Read Only Memory (PROM), Read Only Memory (ROM), Magnetic Memory, Flash Memory, Magnetic or Optical Disk.

The power component 306 provides power to various components of device 300. The power component 306 may include a power management system, one or more power supplies, and other components associated with generating, managing, and distributing power for the device 300.

The multimedia component 308 includes a screen that provides an output interface between the device 300 and the user. In some embodiments, the screen may include a liquid crystal display (LCD) and a touch panel (TP). When the screen includes a touch panel, the screen may be implemented as a touch screen to receive input signals from a user. The touch panel includes one or more touch sensors to sense touches, swipes, and gestures on the touch panel. The touch sensor may not only sense a boundary of a touch or swipe action, but also detect duration and pressure associated with the touch or swipe action. In some embodiments, the multimedia component 308 includes a front-facing camera and/or a rear-facing camera. When the device 300 is in an operation mode, such as a shooting mode or a video mode, the front-facing camera and/or the rear-facing camera can receive external multimedia data. Each front-facing camera and rear-facing camera may be a fixed optical lens system or have focal length and optical zoom capability.

The audio component 310 is configured to output and/or input audio signals. For example, the audio component 310 includes a microphone (MIC), which is configured to receive external audio signals when the device 300 is in operation modes, such as call mode, recording mode and voice recognition mode. The received audio signals may be further stored in memory 304 or sent via the communication component 316. In some embodiments, the audio component 310 also includes a speaker for outputting audio signals.

The I/O interface 312 provides an interface between the processing component 302 and a peripheral interface module, which may be a keyboard, a click wheel, a button, and the like. These buttons may include, but are not limited to: a home button, volume buttons, start button, and lock button.

The sensor component 314 includes one or more sensors for providing various aspects of status assessment for the device 300. For example, the sensor component 314 can detect the open/closed state of the device 300, the relative positioning of components, such as the display and keypad of the device 300, and the sensor component 314 can also detect a change in the position of the device 300 or a component of the device 300, the presence or absence of user contact with the device 300, the orientation or accel-eration/deceleration and the temperature change of the device 300. The sensor component 314 may include a proximity sensor configured to detect the presence of nearby objects in the absence of any physical contact. The sensor component 314 may also include an optical sensor, such as a CMOS or CCD image sensor, for use in imaging appli-cations. In some embodiments, the sensor component 314 may also include an acceleration sensor, a gyroscope sensor, a magnetic sensor, a pressure sensor or a temperature sensor.

The communication component 316 is configured to facilitate wired or wireless communication between the device 300 and other devices. The device 300 can access wireless networks based on communication standards, such as WiFi, 2G or 3G, or a combination thereof. In an example embodiment, the communication component 316 receives broadcast signals or broadcast related information from an external broadcast management system via a broadcast channel. In an example embodiment, the communication component 316 also includes a near field communication (NFC) module to facilitate short-range communication. For example, the NFC module may be implemented based on Radio Frequency Identification (RFID) technology, Infrared Data Association (IrDA) technology, Ultra Wide Band (UWB) technology, Bluetooth (BT) technology and other technologies.

In an example embodiment, the device 300 may be programmed by one or more application specific integrated circuits (ASICs), digital signal processors (DSPs), digital signal processing devices (DSPDs), programmable logic devices (PLDs), field programmable A gate array (FPGA), controller, microcontroller, microprocessor or other elec-tronic component implementation for performing the meth-ods described above.

In an example embodiment, there is also provided a non-transitory computer-readable storage medium including instructions, such as the memory 304 including instructions, which may be executed by the processor 320 of the device 300 to complete the above methods. For example, the non-transitory computer readable storage medium may be ROM, random access memory (RAM), CD-ROM, magnetic tape, floppy disk, optical data storage device, or the like.

Figure 10:
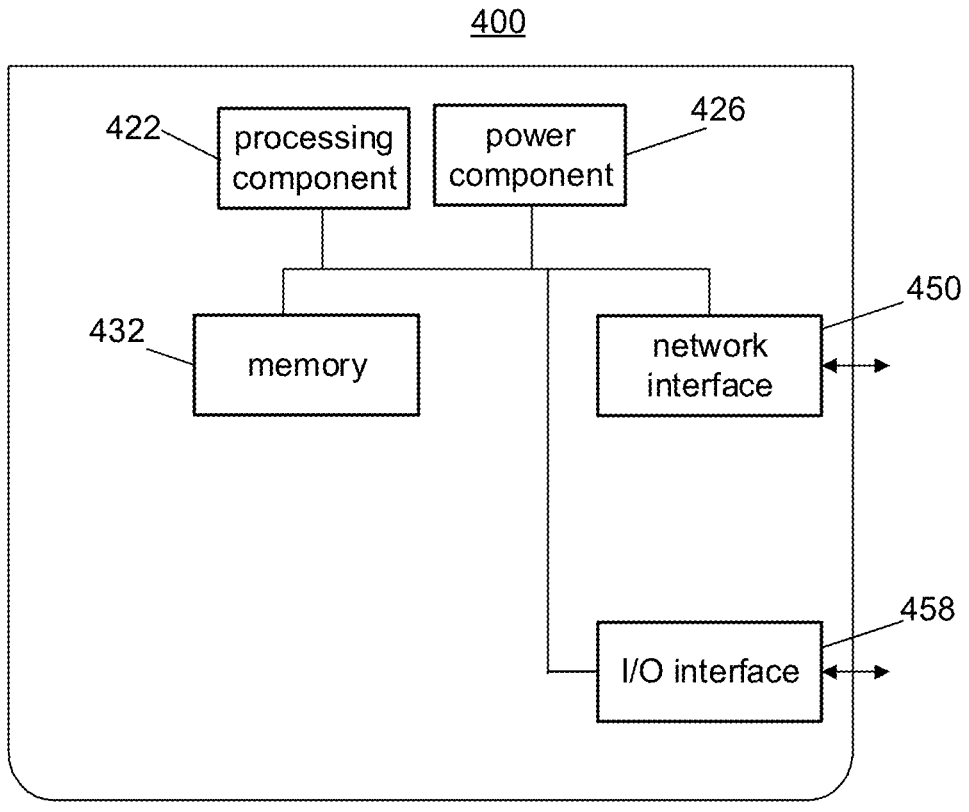
FIG. 10 is a block diagram illustrating another apparatus for sending a data packet according to an example embodiment.

FIG. 10 is a block diagram illustrating a device 400 for sending a data packet according to an example embodiment. For example, the device 400 may be a server. As illustrated in FIG. 10, the device 400 includes a processing component 422, which further includes one or more processors, and a memory resource represented by memory 432 for storing instructions executable by the processing component 422, such as an application program. The application program stored in the memory 432 may include one or more modules each corresponding to a set of instructions. In addition, the processing component 422 is configured to execute instruc-tions to perform the above methods.

The device 400 may also include a power component 426 configured to perform power management of the device 400, a wired or wireless network interface 450 configured to connect the device 400 to a network, and an input/output (I/O) interface 458. The device 400 can operate based on an operating system stored in the memory 432, such as Win-dows Server™, Mac OS X™, Unix™, Linux™, FreeBSD™ or the like.

The technical solutions according to embodiments of the disclosure may include the following beneficial effects. By determining the time offset for sending the first data packet for the router sending the first data packet in the disclosure, the router can send the first data packet within a range of the time offset of the sending time, which can effectively reduce the pressure on the router to process the data packet.

It is further understandable that the phrase "a plurality of" in the disclosure refers to two or more, and other quantifiers are similar thereto. The phrase "and/or" describes the asso-ciation relationship of associated objects, indicating that there may be three types of relationships. For example, A and/or B may indicate only A, only B, and both A and B. The character "/" generally indicates that the contextual objects are an "or" relationship. The singular forms "a", "an" and "the" are also intended to include the plural unless the context clearly dictates otherwise.

It is further understandable that the terms "first", "sec-ond", etc. are used to describe various information, but the information should not be limited to these terms. These terms are only used to distinguish information of the same type from one another, and do not imply a specific order or degree of importance. In fact, expressions such as "first" and "second" may be used interchangeably. For example, with-out departing from the scope of the disclosure, first infor-mation may also be called second information, and similarly, second information may also be called first information.

It is further understandable that although operations are described in a specific order in the drawings in embodiments of the disclosure, this should not be understood as that these operations should be performed in the specific order shown or in a serial order, or that all operations shown should be performed to obtain the desired result. In certain circum-stances, multitasking and parallel processing may be advan-tageous.

Other embodiments of the disclosure will be readily apparent to those skilled in the art from consideration of the specification and practice of the disclosure herein. This application is intended to cover any modification, use or adaptation of the disclosure. These modifications, uses or adaptations follow the general principles of the disclosure and include common knowledge or conventional technical means in the technical field not disclosed in the disclosure. The specification and embodiments are to be considered as examples only, with a true scope and spirit of the disclosure being indicated by the following claims.

It is understandable that the disclosure is not limited to the precise constructions which have been described above and shown in the accompanying drawings, and various modifi-cations and changes may be made without departing from the scope thereof. The scope of the disclosure is limited only by the appended claims.

What is claimed is:

1. A method for sending a data packet, performed by a first device, comprising:

sending a first data packet based on a format of the first data packet;

wherein the first data packet comprises a router identifier field and a time field;

the router identifier field comprises a router identifier and the router identifier is used for indicating a router for sending the first data packet; and the time field comprises a first time and a second time corresponding to the router identifier, and the first time and the second time are used for indicating a time range within which the router completes sending the first data packet.

2. The method of claim 1, wherein the first time is a time when the router sends the first data packet and the second time is a time offset, relative to the first time, allowed by the router for sending the first data packet; or the first time is an earliest time for the router to send the first data packet and the second time is a latest time for the router to send the first data packet.

3. The method of claim 2, wherein the first time is an absolute time.

4. The method of claim 1, wherein the first data packet is an Internet Protocol (IP) data packet.

5. The method of claim 1, wherein the router identifier field comprises a plurality of router identifiers contained in a routing table, and each of the plurality of router identifiers has a respective first time and a respective second time for sending the first data packet;

a plurality of routers corresponding to the plurality of router identifiers send the first data packet based on the routing table, respective first time and respective second time.

6. The method of claim 1, wherein the first data packet further comprises a hop count field;

the hop count field comprises a number of hops, and the number of hops comprises a total number of hops for a transmission of the first data packet by the router identified by the router identifier and a number of hops from the router to a destination device.

7. A method for sending a data packet, performed by a second device, comprising:

receiving a first data packet based on a format of the first data packet;

wherein the first data packet comprises a router identifier field and a time field;

the router identifier field comprises a router identifier and the router identifier is used for indicating a router for sending the first data packet; and the time field comprises a first time and a second time corresponding to the router identifier, and the first time and the second time are used for indicating a time range within which the router completes sending the first data packet.

8. The method of claim 7, wherein the first time is a time when the router sends the first data packet and the second time is a time offset, relative to the first time, allowed by the router for sending the first data packet; or the first time is an earliest time for the router to send the first data packet and the second time is a latest time for the router to send the first data packet.

9. The method of claim 8, wherein the first time is an absolute time.

10. The method of claim 7, wherein the first data packet is an Internet Protocol (IP) data packet.

11. The method of claim 7, wherein the router identifier field comprises a plurality of router identifiers contained in a routing table, and each of the plurality of router identifiers has a respective first time and a respective second time for sending the first data packet;

a plurality of routers corresponding to the plurality of router identifiers send respective first data packet based on the routing table, respective first time and respective second time.

12. The method of claim 7, wherein the first data packet further comprises a number of hops field;

the number of hops field comprises a number of hops, and the number of hops comprises a total number of hops for a transmission of the first data packet by the router identified by the router identifier and a number of hops from the router to a destination device.

13. A device for sending a data packet, comprising:

a processor; and a memory storing machine-readable instructions that, when executed by the processor, cause the processor to:

send a first data packet based on a format of the first data packet;

wherein the first data packet comprises a router identifier field and a time field;

the router identifier field comprises a router identifier and the router identifier is used for indicating a router for sending the first data packet;

the time field comprises a first time and a second time corresponding to the router identifier, and the first time and the second time are used for indicating a time range within which the router completes sending the first data packet.

14. A non-transitory computer-readable storage medium, wherein when instructions stored on the storage medium are executed by a processor of a mobile terminal, the mobile terminal is caused to perform the method of claim 1.

15. The device of claim 13, wherein the first time is a time when the router sends the first data packet and the second time is a time offset, relative to the first time, allowed by the router for sending the first data packet; or the first time is an earliest time for the router to send the first data packet and the second time is a latest time for the router to send the first data packet.

16. The device of claim 15, wherein the first time is an absolute time.

17. The device of claim 13, wherein the first data packet is an Internet Protocol (IP) data packet.

18. The device of claim 13, wherein the router identifier field comprises a plurality of router identifiers contained in a routing table, and each of the plurality of router identifiers has a respective first time and a respective second time for sending the first data packet;

a plurality of routers corresponding to the plurality of router identifiers send respective first data packet based on the routing table, respective first time and respective second time.

19. A device for sending a data packet, comprising:

a processor; and a memory storing machine-readable instructions that, when executed by the processor, cause the processor to perform the method of claim 7.

20. A non-transitory computer-readable storage medium, wherein when instructions stored on the storage medium are executed by a processor of a mobile terminal, the mobile terminal is caused to perform the method of claim 7.

* * * * *